United States Patent [19]

Mastronardo

[11] Patent Number: 4,705,169

[45] Date of Patent: Nov. 10, 1987

[54] MULTIPLE CASSETTE STORAGE TRAY

[75] Inventor: Patrick Mastronardo, Stamford, Conn.

[73] Assignee: Lebo Peerless, Inc., Bloomfield, N.J.

[21] Appl. No.: 918,012

[22] Filed: Oct. 14, 1986

[51] Int. Cl.⁴ .......................................... B65D 85/672
[52] U.S. Cl. .................................. 206/387; 206/564;
220/22; 312/12
[58] Field of Search ............... 206/387, 493, 558, 564;
220/20, 22; 211/40, 41; 312/8, 10, 12

[56] References Cited

U.S. PATENT DOCUMENTS 4,231,473 11/1980 Aprahamian ........................ 206/387
4,293,075 10/1981 Veralrud ............................. 206/387
4,411,481 10/1983 Berkman ............................. 206/387
4,518,084  5/1985 Berkman ............................. 206/493

Primary Examiner—Jimmy G. Foster
Attorney, Agent, or Firm—Marvin Feldman

[57] ABSTRACT

A storage tray is constructed with a plurality of parallel compartments, with each compartment formed so as to receive two unboxed cassettes, one boxed cassette, an 8-track cartridge or an 8 mm video boxed cassette. The unboxed cassettes are held in place by flexible wall portions for engaging the end ribs of a conventional unboxed cassette. The bottom portion or surface of the tray is free of upwardly protruding members so as to give a clean aesthetically acceptable appearance.

8 Claims, 8 Drawing Figures

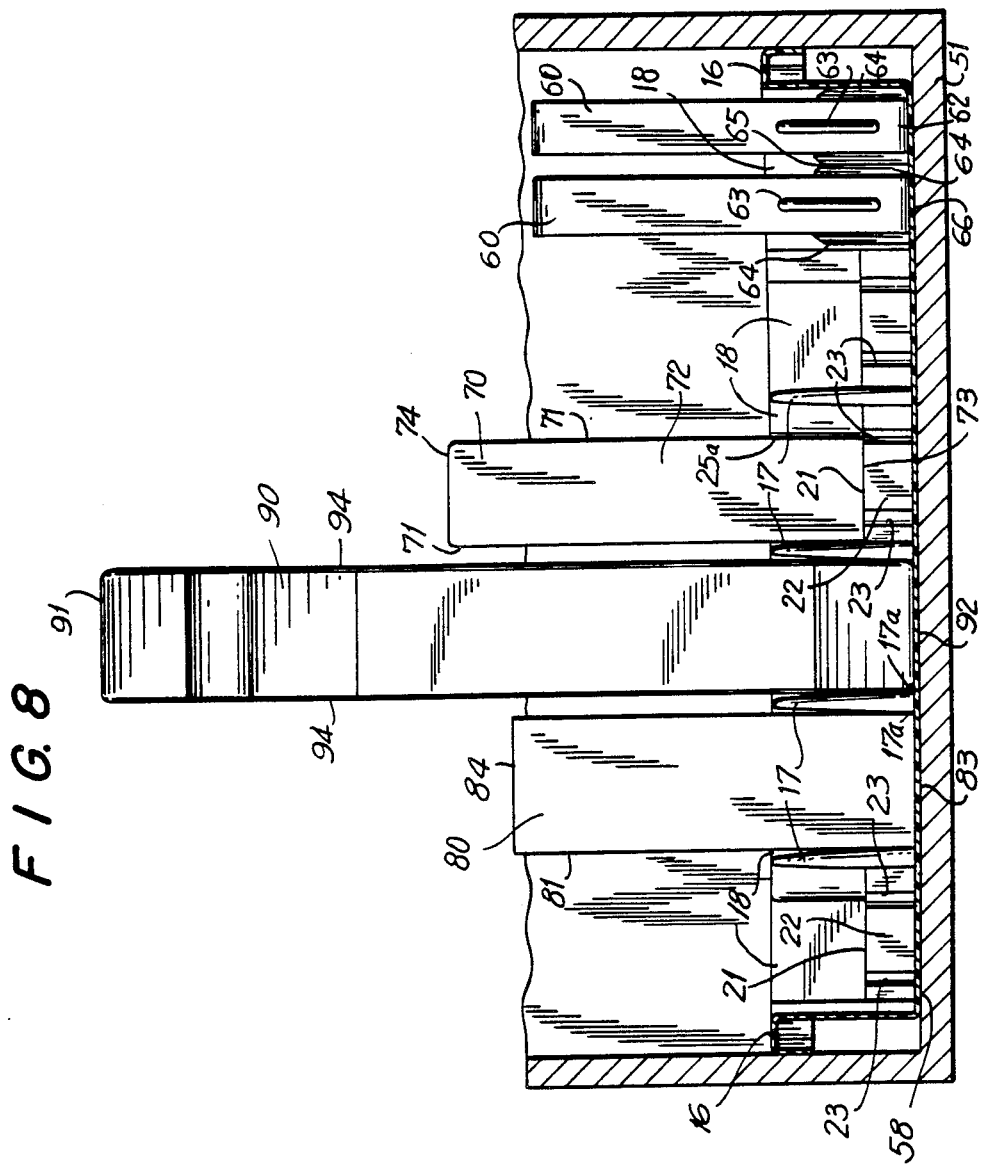

MULTIPLE CASSETTE STORAGE TRAY

FIELD OF THE INVENTION

This invention relates to tray and cases for audio and video cassettes.

BACKGROUND AND DISCUSSION OF THE PRIOR ART

In U.S. Pat. No. 4,293,075, granted Oct. 6, 1981 to Veralud, there is disclosed a tray having a plurality of parallel compartments with each compartment holding one 8-track cartridge, one boxed audio cassette or one unboxed audio cassette.

In Kryter, U.S. Pat. No. 3,756,383 and Berkman, U.S. Pat. No. 4,432,453, there are disclosed constructions whereby two unboxed cassettes are stored in a single tray compartment. These constructions required projection members or separators which extended upwardly from the tray bottom into the center of the tray. These projection members provided dual spaces to two unboxed audio cassettes. These projection members caused an awkward and aesthetically undesirable appearance.

The art desired a more aesthetically acceptable construction with improved holding of two unboxed cassettes in a single compartment. Still further the present art required that 8 mm boxed video cassettes be accomodated in the tray in addition to the boxed and unboxed audio cassettes.

SUMMARY OF THE INVENTION

A tray is formed with a molded side wall construction which provides a plurality of parallel compartments, with each compartment alternatively holding an 8-track cartridge, an 8 mm video cassette box, a boxed audio cassette or two unboxed audio cassettes. The unboxed audio cassettes are held in end rib grabbing walls with vertically disposed grooves. The present wall construction eliminates the need for members projecting upwardly from the tray bottom within the compartment. Divider walls which define the compartments are of tapered or flared constructed to guide the cassettes and grippingly engage the sides of the 8 mm video cassette box and 8-track cartridge.

DESCRIPTION OF THE DRAWINGS

FIG. 8 is a partial fragmentary sectional view taken along line 8—8 of FIG. 3.

DESCRIPTION OF HE PREFERRED EMBODIMENT

Figure 1:
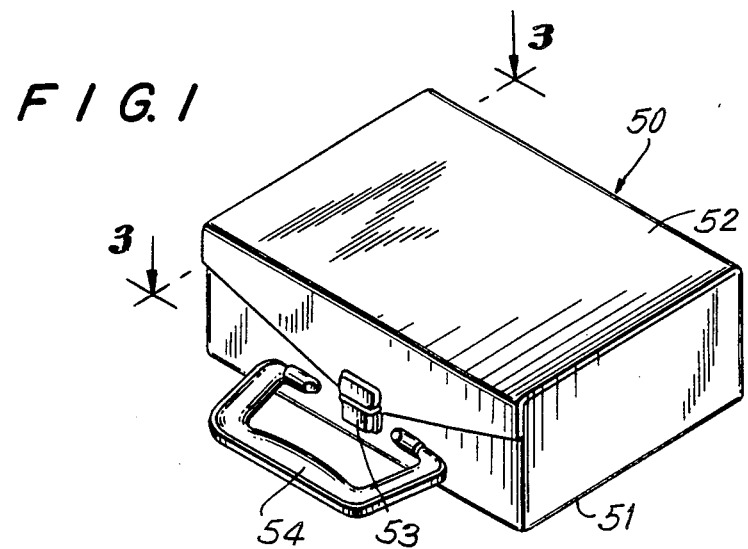
FIG. 1 is a perspective view of a carrying case in the closed position with the cassette tray (not shown) bonded therein.
Figure 2:
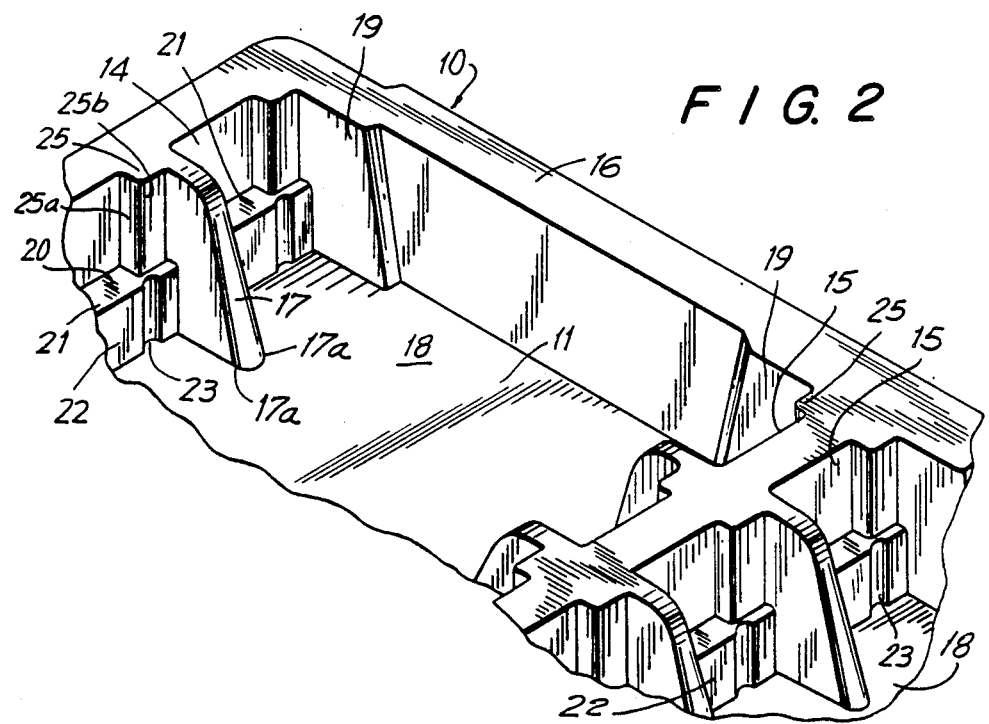
FIG. 2 is a fragmentary perspective view of a corner of the tray.

Referring to the FIGURES there is shown the tray 10 of the present invention. Tray 10 is formed of molded plastic sheet construction. Broadly speaking, tray 10 is formed of a bottom wall 11, front wall 12, rear wall 13, side walls 14 intermediate side walls 15, and top wall 16, which walls are interconnected to provide two storage areas 10A.

The following description is generally limited to a discussion of one storage area 10A, but it is to be understand that the description would also be applicable to the second area 10A.

A plurality of opposed dividers or divider walls 17 extend inwardly from walls 14 and 16 to form a plurality of parallel compartments 18 between the dividers, as well as between the fron and rear dividers and the front wall 12 and rear wall 13, respectively. Walls 12 and 13 are formed with partial divider wall portions 19 which form the end most compartments. It is important to note that dividers 17 are outwardly flared as at 17a, for purposes hereinafter appearing.

Each compartment 18 is formed with opposed ledge walls 20 which extend inwardly from walls 14 and 15, respectfully so as to provide top ledges 21 and vertically facing walls 22. Each facing wall 22 is formed with two spaced vertically extending grooves 23, for purposes hereinafter appearing. The molded plastic sheet construction renders the facing walls flexible is as to grippingly hold the unboxed cassettes between the end walls.

A generally rectilinear corner post or rib 25 is formed at the with and on one side of each divider and each side wall. Rib 25 extends downwardly from top wall 16 to ledge 21, and provides vertical, angularly disposed surfaces 25a and 25b, for purposes hereinafter appearing.

Figure 3:
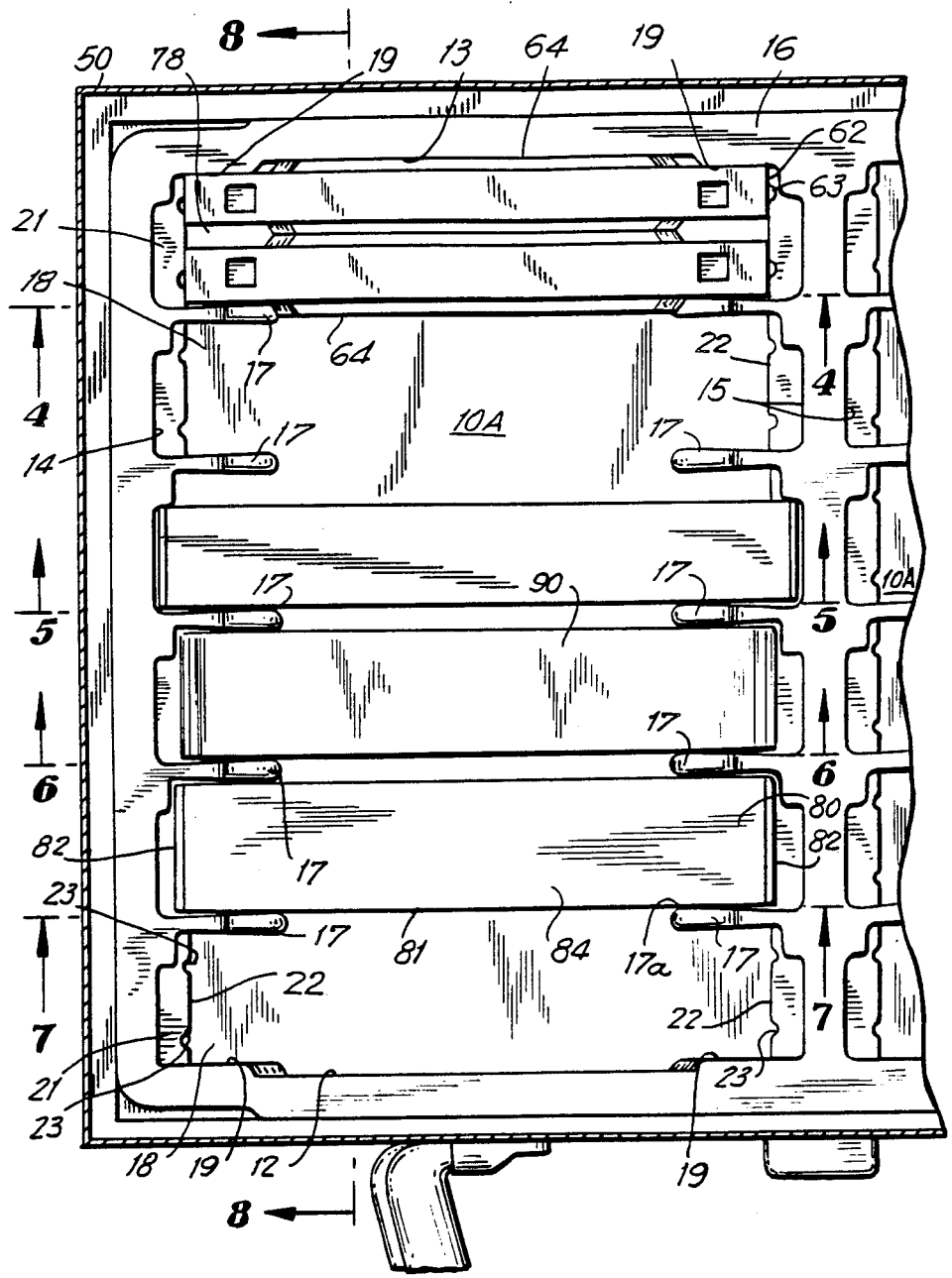
FIG. 3 is a partial sectional top plan view taken along line 3—3 of FIG. 1 showing approximately half of the tray, with two unboxed audio cassettes in the first (topmost) compartment, a boxed audio cassette inthe third compartment, an 8-track cartridge in the fourth compartment, and an 8 mm video cassette box in the fifth compartment, with the second and sixth compartments being unoccupied.
Figure 4:
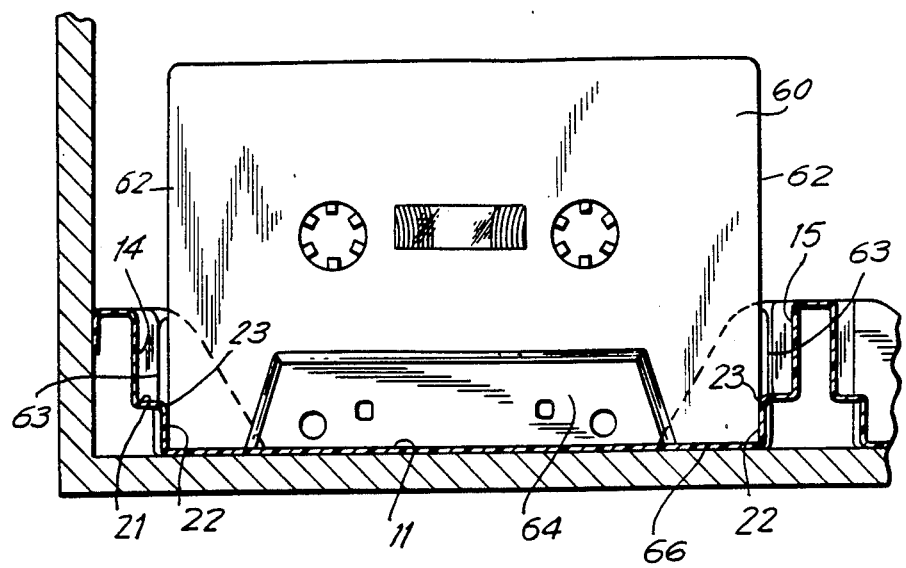
FIG. 4 is a sectional view taken along line 4—4 of FIG. 3.
Figure 5:
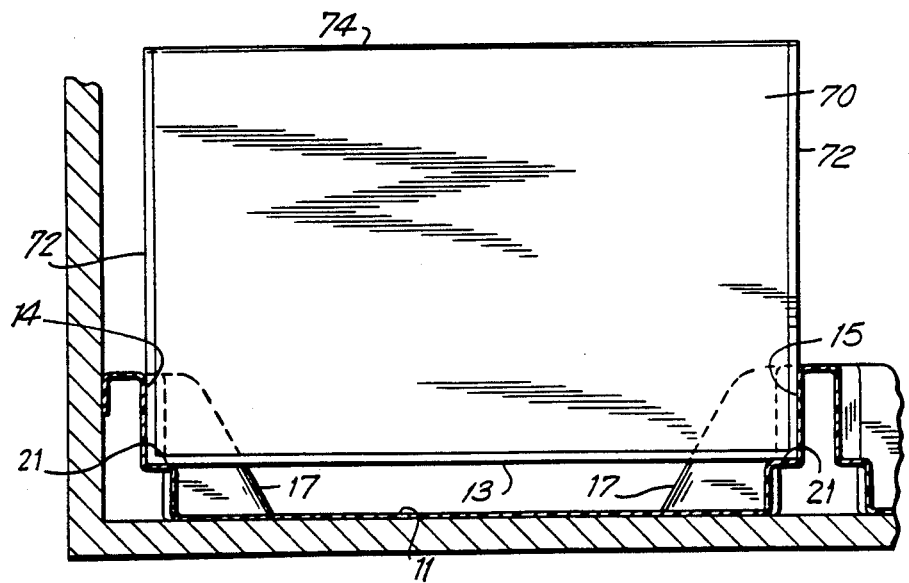
FIG. 5 is a sectional view taken along line 5—5 of FIG. 3.
Figure 6:
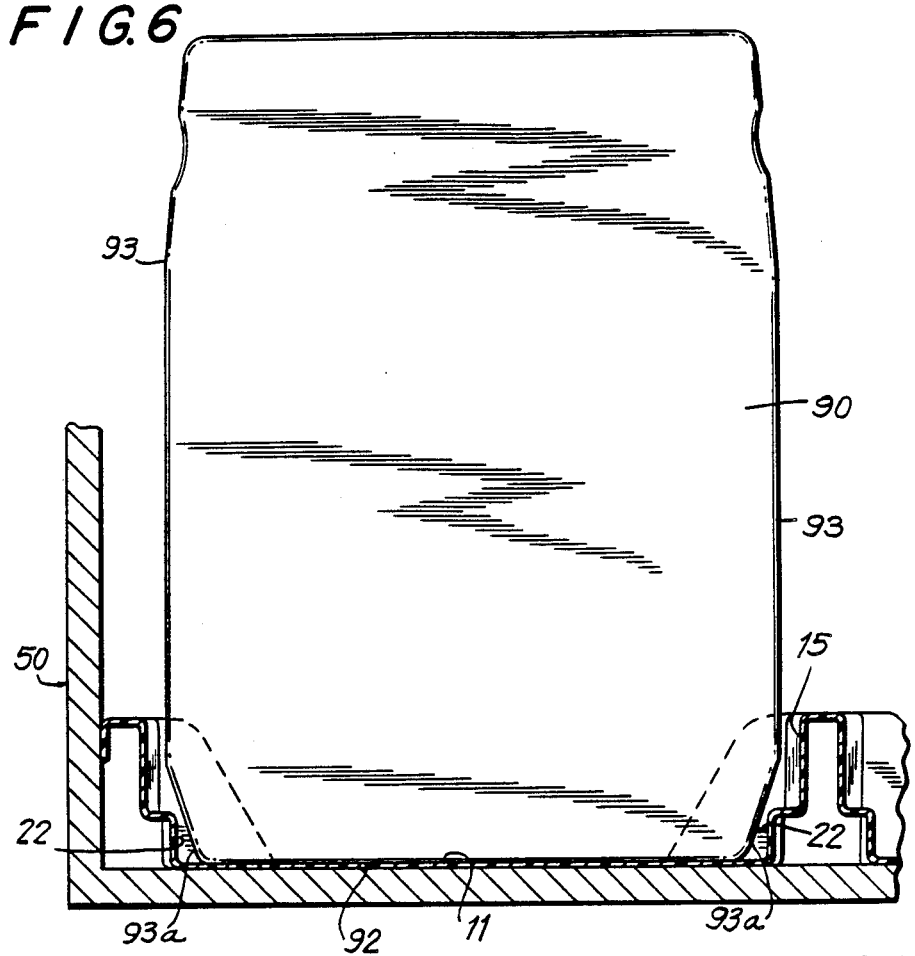
FIG. 6 is a sectional view taken along line 6—6 of FIG. 3.
Figure 7:
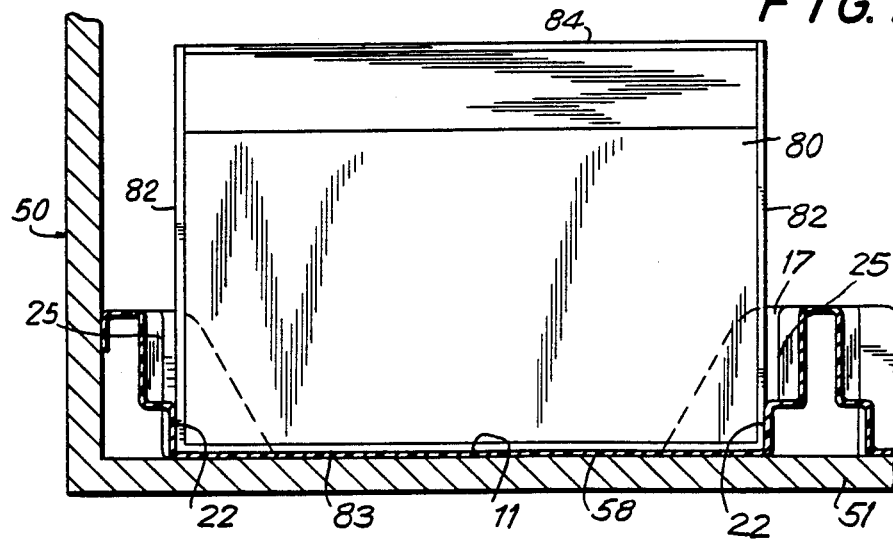
FIG. 7 is a sectional view taken along line 7—7 of FIG. 3.

Conventional unboxed audio cassette 60, has sides 61, ends 62 with ribs 63, and side flanges or pieces 64. Each unboxed cassette 60 is snap-fitted into the compartment with the lower portion of ribs 63 fitting into grooves 23, and ends 62 abutting facing walls 22. The side pieces 64 of adjacent cassettes 60 are in abutting relationship as shown at 65. One set of sides 61 abuts tray dividers 17 and/or end walls 13. Two unboxed cassettes 60 are stored in one compartment 18, as best shown in FIG. 3. The bottom 66 of each cassette rests flush on the tray bottom 11 of tray 10 (FIG. 8).

Conventional boxed audio cassette 70 is formed with sides 71, ends 72, bottom 73 and top 74. Ends 72 slidingly engage and are fitted between walls 14 and 15, and sides 71 slidingly engage and are fitted betwen wall portion or surface 25a and divider 17. Box bottom 73 rests on ledge wall 21 (FIG. 8). One boxed cassette is stored in one tray compartment.

Conventional 8 mm boxed video cassette 80 is formed with sides 81, ends 82, bottom 83 and top 84. Ends 82 frictionally engage facing walls 22, and sides 81 are sliding fit between adjacent dividers 17, and are guided by the flared dividers into storage position. In effect, cassette box ends 82 are wedged between facing walls 22, and sliding engaged flared portions 17a. Bottom 83 contactingly rests flush on tray bottom 11 (FIG. 8).

Conventional 8-track cartridge 90 is formed with top 91, bottom 92, ends 93, and sides 94. Ends 93 have inwardly tapered lower portions 93a. With cartridge 90 stored in compartment 18, ends 93, 93a are spaced facing walls 22, and cartridge sides 94 fictionally engage the flared portions 17a of the dividers 17 to hold the cartridge in place. Bottom 92 contactingly rests flush on tray bottom 11 (FIG. 8).

Referring specifically to FIG. 1, there is shown carrying case 50 with tray 10 (not shown) bonded to bottom 51. Case 50 has a hinged top 52 with a clasp closure 53, and carrying handle 54. Case 50 permits the ready transport of the diverse cassettes. It is to be noted that tray 10 is formed of a unitary plastic sheet with an extensive bottom surface 58 for ready bonding to bottom 51 of case 50. Case 50 may be formed of synthetic plastic (simulated leather), fabric or plastic-treated fabric.

There has thus been shown and described a tray for storing diverse cassettes and cassette boxes, which tray may be readily molded of sheet material and yet provides an aesthetically desirable appearance, free of compartment protruding members.

The herebefore described embodiment is for illustrative purposes only, and various changes and modifications may be made within the spirit and scope of the present invention as defined by the adjoined claims.

What is claimed is:

1. A storage tray for unboxed audio cassettes, boxed audio cassettes, 8-track cartridges and 8 mm video boxed cassettes, comprising; a bottom wall, said bottom wall being free of upwardly projecting members so that 8 mm video boxed cassette, 8-track cartridge or unboxed cassettes rest flat on the bottom wall, opposing side walls connected by the bottom wall, front and back walls connected by the bottom wall and side walls, a plurality of dividers extending inwardly from the side walls so as to form a plurality of parallel compartments, each compartment having opposed ledge walls extending inwardly from the opposed side walls and forming upwardly disposed facing walls, said facing walls being formed with spaced parallel vertically extending grooves, and a rib formed at the corner of one divider and the adjacent side wall, wherein the dividers and ledge facing walls are spaced so that one 8-track cartridge or an 8 mm video boxed cassette is receivable in the compartment between opposing dividers and facing walls with the cartridge or 8 mm video boxed cassette disposed on the bottom wall, wherein said ledge facing walls are flexible so as to grippingly engage the unboxed cassettes, and wherein the rib is spaced from the opposed divider so that a boxed audio cassette is received in the compartment between the rib and opposed divider with the boxed audio cassette disposed on the ledges above the bottom wall, and wherein two unboxed cassettes are received in each compartment, with the end ribs of each unboxed cassette being receivable in the grooves and the ends of the unboxed cassettes contactingly engaging the facing walls so as to hold each unboxed cassette upright with the unboxed cassette disposed on the bottom wall.

2. The storage tray of claim 1, wherein said 8 mm video boxed cassette and said boxed audio cassette are frictionally engaged within the compartment.

3. The storage tray of claim 1, wherein said side walls are formed with a top wall and said rib extends downwardly from said top wall to said ledge.

4. The storage tray of claim 3, wherein the ledge facing wall is more inwardly disposed than the rib.

5. The storage tray of claim 4, wherein the dividers extend substantially more inwardly than the facing walls.

6. The storage tray of claim 1, wherein each groove extends from the top of the ledge to the bottom wall.

7. The storage tray of claim 1, wherein the dividers are flared so that the space between adjacent dividers at the bottom wall is less that the space between adjacent dividers at the top of the tray so that the 8 mm video boxed casette is frictionally held between the flared portion of the dividers at the bottom wall.

8. The storage tray of claim 1, wherein the front and back walls comprise inwardly extending divider portions spaced from and facingly disposed to adjacent dividers.

* * * * *